(12) United States Patent
Hashidume et al.

(10) Patent No.: US 9,305,585 B2
(45) Date of Patent: Apr. 5, 2016

(54) RECORDING DEVICE

(75) Inventors: Jiro Hashidume, Tokyo (JP); Yoshiaki Yamauchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/422,184

(22) PCT Filed: Sep. 6, 2012

(86) PCT No.: PCT/JP2012/072775
§ 371 (c)(1),
(2), (4) Date: Feb. 18, 2015

(87) PCT Pub. No.: WO2014/038046
PCT Pub. Date: Mar. 13, 2014

(65) Prior Publication Data
US 2015/0228299 A1 Aug. 13, 2015

(51) Int. Cl.
G11B 7/095 (2006.01)
G11B 7/0065 (2006.01)
G11B 7/1381 (2012.01)
G11B 7/1392 (2012.01)
G11B 7/0037 (2006.01)
G11B 3/61 (2006.01)

(52) U.S. Cl.
CPC ............ *G11B 7/0065* (2013.01); *G11B 7/0956* (2013.01); *G11B 7/1381* (2013.01); *G11B 7/13927* (2013.01); *G11B 3/61* (2013.01); *G11B 7/0037* (2013.01)

(58) Field of Classification Search
None
See application file for complete search history.

(56) References Cited

U.S. PATENT DOCUMENTS 5,278,709 A * 1/1994 Thornton et al. .......... 360/99.18

FOREIGN PATENT DOCUMENTS

| JP | 64-64163 A | 3/1989 |
| JP | 4-114326 A | 4/1992 |
| JP | 2007-80336 A | 3/2007 |
| JP | 2009-140560 A | 6/2009 |

OTHER PUBLICATIONS

International Search Report (PCT/ISA/210) dated Nov. 13, 2012, with English translation (two (2) pages).

* cited by examiner

*Primary Examiner* — Brian Butcher
(74) *Attorney, Agent, or Firm* — Crowell & Moring LLP

(57) ABSTRACT

The present invention provides a recording device that offers a large displacement control effect. The recording device includes a recording medium 224, a motor 222 that drives the recording medium, and a recording device head M1 that records and reproduces a signal to and from the recording medium. The recording device also has a displacement control mechanism M2. The displacement control mechanism M2 includes a vibrating plate 226 that has two opposing surfaces facing the recording medium, the vibrating plate being displaced in the rotation axis direction of the recording medium; and an oscillator 232 that is positioned away from the two opposing surfaces of the vibrating plate facing the recording medium, the oscillator driving and displacing the vibrating plate.

11 Claims, 5 Drawing Sheets

RECORDING DEVICE

TECHNICAL FIELD

The present invention relates to a recording device that uses a flat recording medium. More particularly, the invention relates to a recording medium that restrains the displacement of a rotating recording medium in the rotation axis direction.

BACKGROUND ART

In recent years, the ever-growing quantities of electronic information stemming from the spread of the Internet and increasing quality of images in particular have entailed the ever-larger capacities of optical disks, which is one of the most principal information recording medium. The larger recording capacities have been implemented in the past in the form of CDs, DVDs, BDs, etc., with the focused spot size reduced by increasing the numerical aperture of the Object lens and shortening the wavelength of the light beam and with the number of recording layers increased. However, to implement ever-higher recording densities requires resorting to new storage techniques that are different from the existing techniques of increasing the numerical aperture and shortening the wavelength.

One of the promising next-generation storage techniques is the holographic memory. In general, information is recorded to the holographic memory in the following manners: a signal light beam carrying page data information modulated two-dimensionally by a spatial light modulator (SLM) is allowed to interfere with a reference light beam to generate an interference pattern that is fixed onto a disk-type recording medium (optical disk) as a refractive index distribution. When the incident angle of the reference light beam relative to the recording medium is changed, multiple types of information can be recorded simultaneously to a single recording location. The information thus recorded is read out as follows: emitting the reference light beam used in recording to the recording medium at the same angle as upon recording causes diffracted light to emanate from the interference pattern fixed on the recording medium, the diffracted light then being detected by a photodetector to reproduce the recorded page data information. In this manner, the holographic memory allows multiple types of two-dimensional information to be written to and read from a single recording location therein, so that high-density information can be recorded and readout at a high speed.

However, if the recording medium is tilted during reading, the amount of diffracted light from the interference pattern fixed on the medium is reduced, which makes it difficult to obtain a good readout signal. Also, while the flat recording medium is being driven so as to rotate, a displacement of the recording medium due to its own bend or vibrations can distort the beam of diffracted light detected by the photodetector from the medium during reading for example, leading to a degenerated readout signal.

As a countermeasure to the above problem, there is a known technique for using a motor and gear to tilt the spindle motor rotating the recording medium in a manner compensating for the tilt of the medium (e.g., see Patent Document 1).

There is also a known technique for supporting the recording medium edge with a ball or roller arrangement to compensate for the tilt of the recording medium (e.g., see Patent Document 2).

However, the problems with the structure of Patent Document 1 are that because the tilt of the recording medium rotating at a high speed is measured, and a relatively massive spindle motor to which the recording medium is fixed is inclined in keeping with the amount of the measured tilt, response speed becomes lower and the structure involved turns out to be complicated.

Meanwhile, the problem with the structure of Patent Document 2 is that because the tilt of the recording medium is controlled with rollers pressed fixedly to the recording medium edge, the structure is simple but the recording medium surface can be damaged and worn from contact with the rotating rollers.

In order to solve the above problems, there is a known technique for having vibration generators positioned opposed to each other above and below the recording medium in the rotation axis direction in such a manner that the generators do not have contact with the medium, the vibration generators generating vibrations to apply pressure fluctuations between the recording medium and the vibration generators to thereby control the displacement of the recording medium in the rotation axis direction (e.g., see Patent Document 3). With this structure, no chafe occurs on the recording medium because the medium is controlled from being displaced in a non-contact manner by means of the air pressure coming from the vibration generators.

PRIOR ART LITERATURE

Patent Document

Patent Document 1: JP-1992-114326-A
Patent Document 2: JP-1989-64163-A
Patent Document 3: JP-2009-140560-A

SUMMARY OF THE INVENTION

Problem to be Solved by the Invention

However, in the structure of Patent Document 3 in which the vibration generators are positioned in the rotation axis direction of the recording medium, the vibration generators are not allowed to be thick in the rotation axis direction in a limited space inside the recording device, which makes it difficult to obtain large vibration amplitude. That is, the displacement that can be controlled is small; the structure has the problem of having only a limited effect in controlling the displacement.

An object of the present invention is to provide a recording device that offers a large effect in controlling the displacement.

Means for Solving the Problem

In achieving the above object, the present invention provides a recording device including: a recording medium; a motor that drives the recording medium; a head that records and reproduces a signal to and from the recording medium; a vibrating plate that has two opposing surfaces facing the recording medium, the vibrating plate being displaced in the rotation axis direction of the recording medium; and an oscillator that is positioned away from the two opposing surfaces of the vibrating plate facing the recording medium, the oscillator driving and displacing the vibrating plate.

This structure offers a large displacement control effect.

Effect of the Invention

According to the present invention, the displacement control effect of the recording device can be improved.

MODE FOR CARRYING OUT THE INVENTION

The structure and operation of the recording device as the first embodiment of the present invention will now be described with reference to FIGS. 1 through 4.

The structure and operation of the recording device of the present embodiment will first be explained below.

Figure 1:
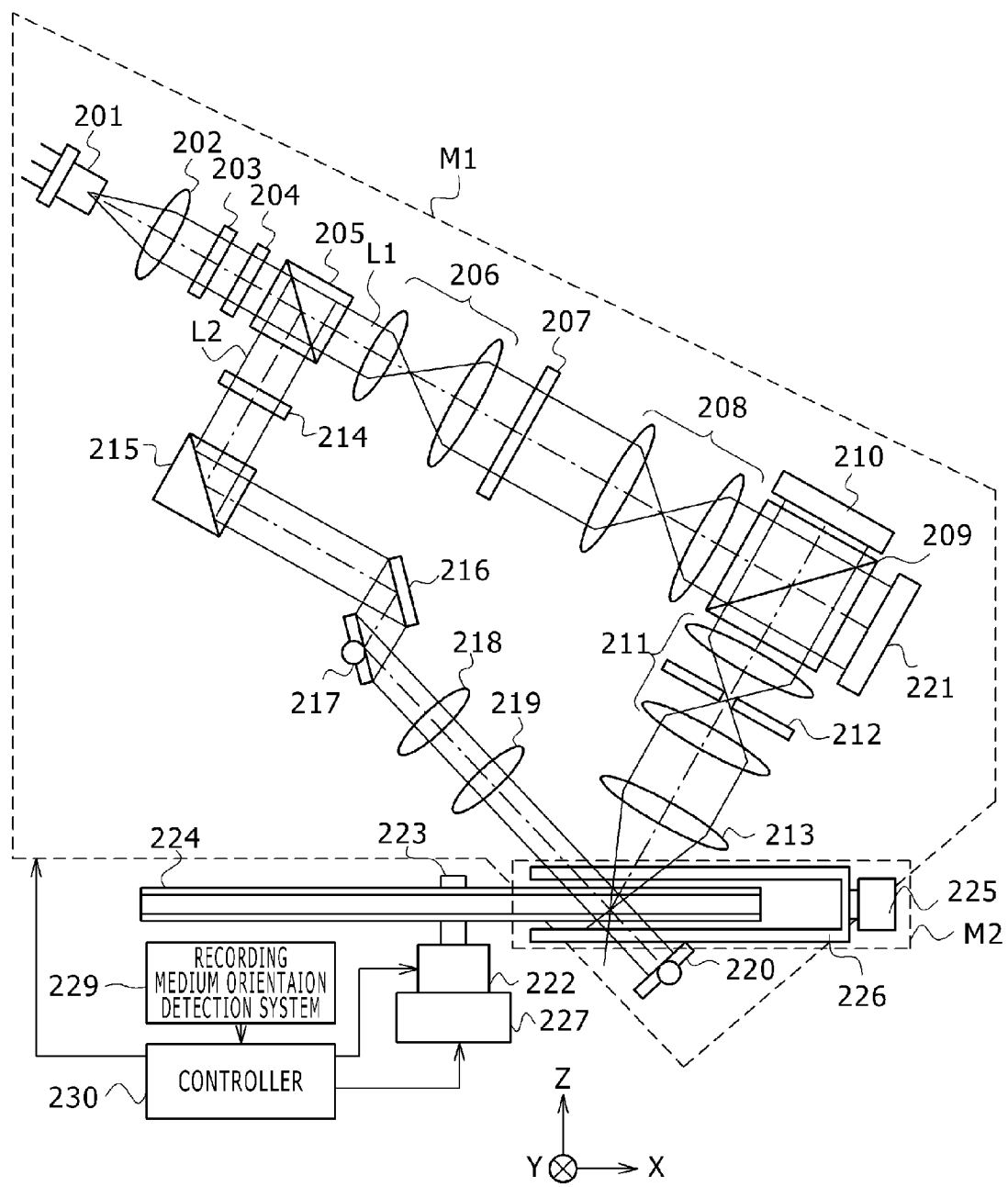
FIG. 1 is an overall structure diagram of a recording device as a first embodiment of the present invention.

FIG. 1 is an overall structure diagram of the recording device as the first embodiment of the present invention.

For the present embodiment, an optical disk recording device that uses a hologram memory device (head) M1 will be explained as an example of the recording device.

A recording medium 224 such as an optical disk is fixed to a rotary motor 222 by way of a rotation axis 223. The hologram memory device (head) M1 records and reproduces information to and from the rotating recording medium 224. The present embodiment includes a displacement control mechanism M2 that restrains the displacement of the recording medium 224. The displacement control mechanism M2 will be discussed later in detail with reference to FIG. 2.

The structure and operation of the hologram memory device (head) M1 will be explained first.

A light beam emitted from a light source 20 passes through a collimating, lens 202 and is collimated thereby, before being limited in transit time by an on/off shutter 203. After passing through the shutter 203, the light beam is controlled by a half-wavelength plate 204 in terms of the ratio of p-polarized light to s-polarized light. After being controlled in this manner, the light beam is made incident on a polarization beam splitter 205. A signal light beam L1 that passed through the polarization beam splitter 205 is expanded in beam diameter by a beam expander 206, before passing through a phase mask 207 and a relay lens 208. The signal light beam L1 is then reflected by a polarization beam splitter 209, before being made incident on a spatial light modulator 210. After being supplemented with information by the spatial light modulator 210, the signal light beam L1 passes through the polarization beam splitter 209. Thereafter, the signal light beam L1 passes through a relay lens 211, a spatial filter 212, and an Object lens 213 before being focused on the recording medium 224.

Meanwhile, a reference light beam L2 reflected by the polarization beam splitter 205 is controlled by a polarization direction changing element 214 in a polarization direction appropriate for recording or reading. After being controlled in this manner, the reference light beam L2 is reflected by mirrors 215 and 216 before reaching a galvanometer mirror 217. After being controlled by the galvanometer mirror 217 in the angle of reflection, the reference light beam L2 passes through lenses 218 and 219 before being made incident on the recording medium 224. The incident angle of the reference light beam L2 relative to the recording medium 224 is adjusted by the galvanometer mirror 217 that controls the angle of the reference light beam L2 incident on the recording medium 224.

Once the signal light beam L1 is made to overlap with the reference light beam L2 in the recording medium, 224, an interference pattern formed by the signal light beam L1 and reference light beam L2 is recorded in the recording medium 224 as information. When the incident angle of the reference light beam L2 relative to the recording medium 224 is changed by the galvanometer mirror 217, the information can be recorded in a manner dependent on each of different incident angles, so that angle-dependent multiple information recording is implemented.

The information recorded in the recording medium 224 is read out as follows: the above-mentioned half-wavelength plate 204 is used to adjust the ratio of p-polarized light to s-polarized light, so that the total quantity of the light beam emitted from the light source 201 will constitute the reference light beam L2 reflected by the polarization beam splitter 205. The reference light beam L2 passes through the components in the same order as the above-mentioned reference light beam L2, before passing through the recording medium 224 and being reflected by a galvanometer mirror 220. The reference light beam L2 reflected by the galvanometer mirror 220 is again made incident on the recording medium 224, before being diffracted by the interference pattern recorded in the recording medium 224. The diffracted light beam passes through the Object lens 213, relay lens 211 and spatial filter 212, before being reflected by the polarization beam splitter 209 and made incident on a photodetector 221, whereby the recorded signal is read out. The galvanometer mirrors 217 and 220 are moved in linage, so that when the reference light beam L2 is made incident on the recording medium 224 at each of the same number of incident angles as in recording, the multiple information recorded in the recording medium 224 can be read out therefrom.

The recording medium 224 is fixed to the rotary motor 222 by way of the rotation axis 223. The rotary motor 222 is fixed onto a stage 227. Thus when the rotary motor 22 is used to control the rotation angle of the recording medium 224, with the stage 227 used to control the recording medium position in the X, Y and Z axis directions, it is possible to establish the position in the recording medium 224 at which information is recorded or read out thereto or therefrom.

A recording medium orientation detection system 229 is used to detect the rotation angle, tilt, and position of the recording medium 224. When the recording medium 224 is to be adjusted to a predetermined rotation angle, tilt, and position, the recording medium orientation detection system 229 detects signals corresponding to the rotation angle, tilt, and position of the recording medium. The system further allows a controller 230 to control the rotary motor 222, stage 227 and other relevant components by use of the detected signals.

Explained next with reference to FIG. 2 are the structure and operation of the recording medium displacement control mechanism M2 used by the recording device of this invention.

FIG. 2 is a set of structure diagrams of the recording medium displacement control mechanism, the recording medium being used in the recording device of the first embodiment. In FIG. 2, the same reference numerals as those in FIG. 1 designate the same components.

Figure 2A:
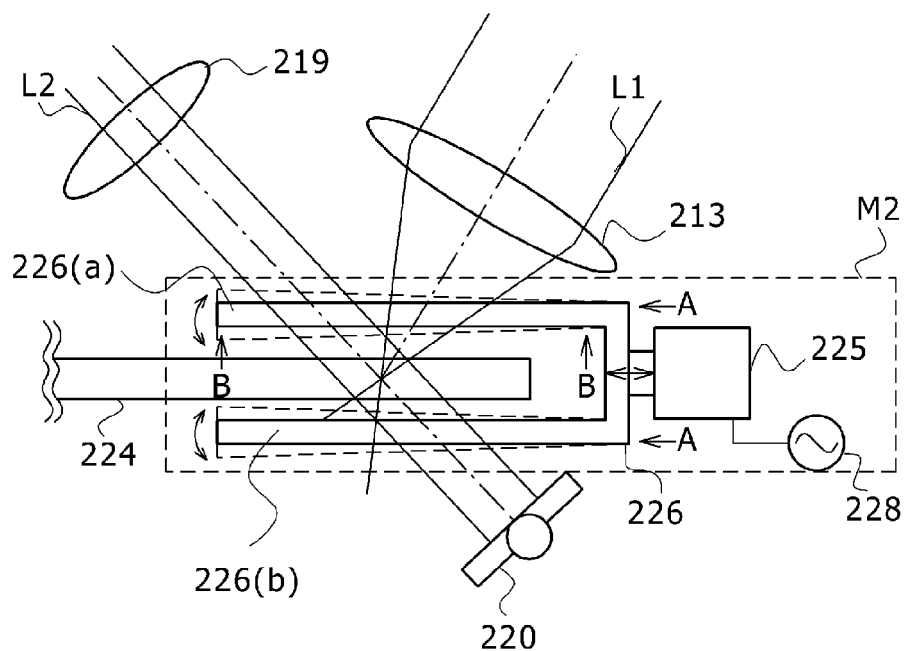
FIG. 2A is a structure diagram of a recording medium displacement control mechanism, the recording medium being used in the recording device of the first embodiment.
Figure 2B:
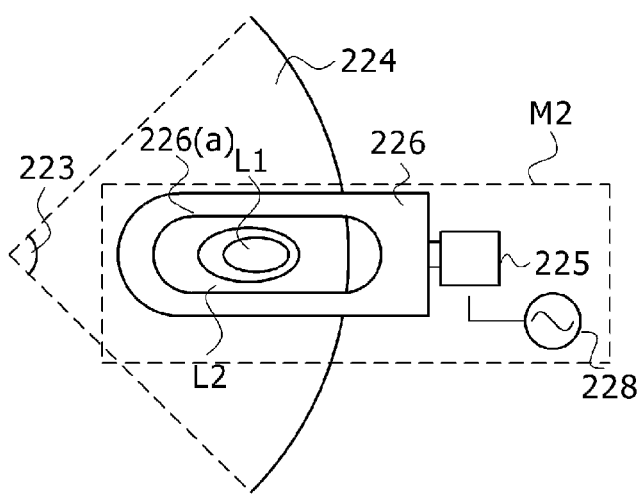
FIG. 2B is another structure diagram of the recording medium displacement control mechanism, the recording medium being used in the recording device of the first embodiment.

FIG. 2A is a front view of the displacement control mechanism M2. That is, the drawing shows the recording medium 224 and the displacement control mechanism M2 as they are seen laterally. FIG. 2B is a plan view of the displacement control mechanism M2. That is, the drawing depicts part of the recording medium and the displacement control mechanism M2 as they are seen in the direction of the rotation axis 223 of the rotary motor 222 from the incident direction of the signal light L1.

The displacement control mechanism M2 is made up of an oscillator 225 and a vibrating plate 226, for example. Typically, the oscillator 225 may be a bolted Langevin type transducer. The oscillator 225 has a piezoelectric element and generates ultrasonic vibration when supplied with power. Although the oscillator may alternatively be a voice coil type oscillator, the Langevin type transducer is preferred because the latter is small in size and can produce large amplitude. The oscillator 225 vibrates by itself actively when supplied with power. The vibrating plate 226 is vibrated passively when the vibration of the oscillator 225 is transmitted thereto.

The vibrating plate 226 has an oval opening region through which the signal light beam L1 and reference light beam L2 pass, in a U-shaped structure integrating an upper vibrating plate 226(a) and a lower vibrating plate 226(b) of the same plate-like shape. At a given resonance frequency, the upper vibrating plate 226(a) and lower vibrating plate 226(b) making up the vibrating plate 226 are 180 degrees apart in vibration amplitude phase. The upper vibrating plate 226(a) and lower vibrating plate 226(b) are positioned to respectively face the upper and lower surfaces of the recording medium 226 in the rotation axis direction with gaps interposed therebetween. In other words, the upper and lower vibrating plates 226(a) and 226(b) are positioned in parallel to each other, with the recording medium 224 located therebetween.

When the oscillator 225 is fed with a predetermined bias voltage from an AC power source 228 followed by an application of predetermined AC voltage, the oscillator 225 starts to vibrate the vibrating plate 226. Moreover, the vibration of the oscillator 225 is amplified by the upper and lower vibrating plates 226(a) and 226(b) in the rotation axis direction of the recording medium 224. When the natural resonance frequency of the vibrating plate 226 is made to coincide with the oscillating frequency of the oscillator 225, the vibrating plates 226 resonates, further enlarging the amplitude of the U-shaped vibrating plate 226 due to the tuning fork effect.

Here, when the upper and lower vibrating plates 226(a) and 226(b) are vibrated in the rotation axis direction of the recording medium 224, a repulsive force toward the recording medium 224 (i.e., so-called squeeze air film pressure for separating the recording medium 224 from each vibrating plate 226) is generated due to what is known as the ultrasonic squeeze effect between each of the upper and lower vibrating plates 226(a) and 226(b) and the recording medium 224. The greater the distance from each vibrating plate 226 of the present embodiment is, the smaller the repulsive force generated thereby is. For example, where the recording medium is positioned closer the lower vibrating plate 226(b) past the intermediate position between the two vibrating plates 226, the recording medium 224 interposed between the respective vibrating plates 226 is subject to a larger repulsive force from the lower vibrating plate 224(b) and is deformed by the force toward the upper vibrating plate 226(a). As a result, the recording medium 224 is held in a non-contact fashion at a position where there is a balance between the repulsive force and the force required to deform the recording medium 224, the repulsive force coming from the upper and lower vibrating plates 226(a) and 226(b).

Figure 3:
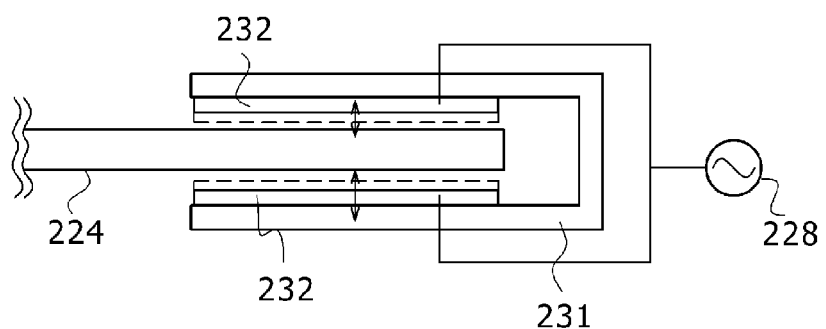
FIG. 3 is an explanatory diagram of an oscillator as a comparative example.

Explained below with reference to FIGS. 3 and 4 is how the vibration differs between a typical existing setup and the present embodiment.

FIG. 3 is an explanatory diagram of an oscillator as a comparative example. FIG. 4 is a set of explanatory diagrams of the vibrating plate used in the recording device of the first embodiment.

FIG. 3 is an explanatory diagram explaining an exemplary structure in which oscillators 232 are positioned above and below the recording medium 224. The flat-type oscillators 232 are positioned, in a manner facing the upper and lower surfaces the recording medium 224 and are fixed to a frame 231.

Figure 4A:
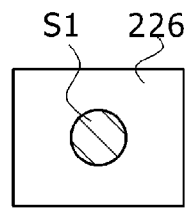
FIG. 4A is an explanatory diagram of a vibrating plate used in the recording device of the first embodiment.
Figure 4B:
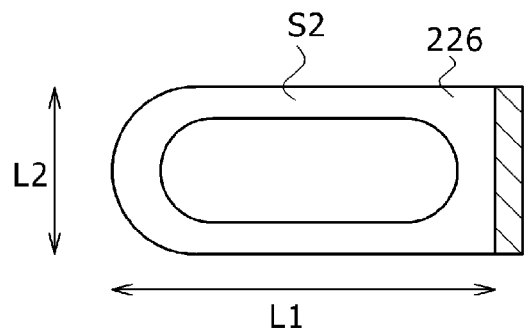
FIG. 4B is another explanatory diagram of the vibrating plate used in the recording device of the first embodiment.

FIG. 4 is a set of explanatory diagrams explaining the vibrating surfaces of the present embodiment. FIG. 4A shows a cross section of the oscillator 226 taken along line A-A in FIG. 2A and viewed toward the recording medium 224. FIG. 4B is a cross section of the oscillator 226 taken along line B-B and viewed from the side of the recording medium.

The repulsive force toward the recording medium 224 varies depending on the amplitude of the vibration generated by the oscillating body arranged to sandwich the recording medium. That is, the larger the amplitude of the vibration is, the greater the repulsive force becomes. Also, the larger the surface area of the oscillating body is, the greater the repulsive force becomes.

In the example shown in FIG. 3, the oscillators 232 are positioned to face both sides of the recording medium 224. When each of the oscillators 232 is supplied with a driving AC voltage from the AC power source 228, the oscillators 232 are vibrated in the rotation axis direction of the recording medium.

In this case, the amplitude of the oscillators 232 is dependent on the oscillator 232's thickness in the vibrating direction, and the repulsive force generated by the oscillators 232 to the recording medium 224 tends to become larger in proportion to the area of those surfaces of the recording medium 224 faced by the oscillators 232. Here, if piezoelectric elements are employed as the oscillators 232, the generally available types of piezoelectric elements measure several millimeters per side and 1 mm or less in thickness. Thus attempts to thicken the oscillators 232 are limited where a large repulsive force is needed. Also, covering an extensive surface area with the piezoelectric elements can be rather expensive. Furthermore, two AC power sources 228 are needed to drive the upper and lower oscillators 232, which leads to a complicated and costly system.

By contrast, in the example shown in FIG. 4, a surface S2 where the vibrating plate 226 faces the recording medium. 224 is different from a surface S1 where the oscillator 255 is in contact with the vibrating plate 226. For this reason, the area of the surface S2 where the vibrating plate 226 faces the recording medium 224 can be enlarged without the surface area of the oscillator 225 getting larger. If the recording medium 224 shown in FIG. 1 is assumed to be a round-and-flat optical disk with a diameter of 130 mm, the size L1 indicated in FIG. 4B (i.e., radial length of the optical disk) may be about 50 mm and the size L2 (i.e., circumferential length of the optical disk) may be about 20 mm. The vibrating plate 226 is formed of metal such as aluminum. Thus a vibrating plate 226 having the size L1 of about 50 mm and the size L2 of about 20 mm can be manufactured easily at low cost. Because the surface S2 where the vibrating plate 226 faces the recording medium 224 can be enlarged as described above, the repulsive force generated by the vibrating plate 226 toward the recording medium 224 can be made greater than in the case of FIG. 3.

Also, the structure in which the oscillator 225 vibrates the vibrating plate 226 allows the vibration of the oscillator 225 to be amplified by the vibrating plate 226 in the rotation axis direction of the recording medium 224. That means the vibration amplitude can be enlarged without the thickness of the oscillator 225 being changed. When the natural resonance frequency of the vibrating plate 226 is made to coincide with the oscillating frequency of the oscillator 225 so as to cause the oscillator 225 to vibrate at the resonance frequency of the vibrating plates 226, the vibration of the oscillating plate 226 can further amplify that of the oscillator 225.

Because the amplitude of the vibration and the area of the vibrating surfaces can be made larger than in the case of FIG. 3 in the manner explained above, it is easy to boost the repulsive force generated toward the recording medium.

By allowing the repulsive force toward the recording medium to be increased easily as described, the present embodiment improves the effect of recording medium displacement control. This improvement makes it possible to render smaller and thinner a displacement control device that restrains the bending of the recording medium (optical disk) or the vibration-induced fluctuation or tilt of the rotating recording medium in the rotation axis direction. That in turn enables implementation of a high-density and high-speed holographic memory.

Figure 5:
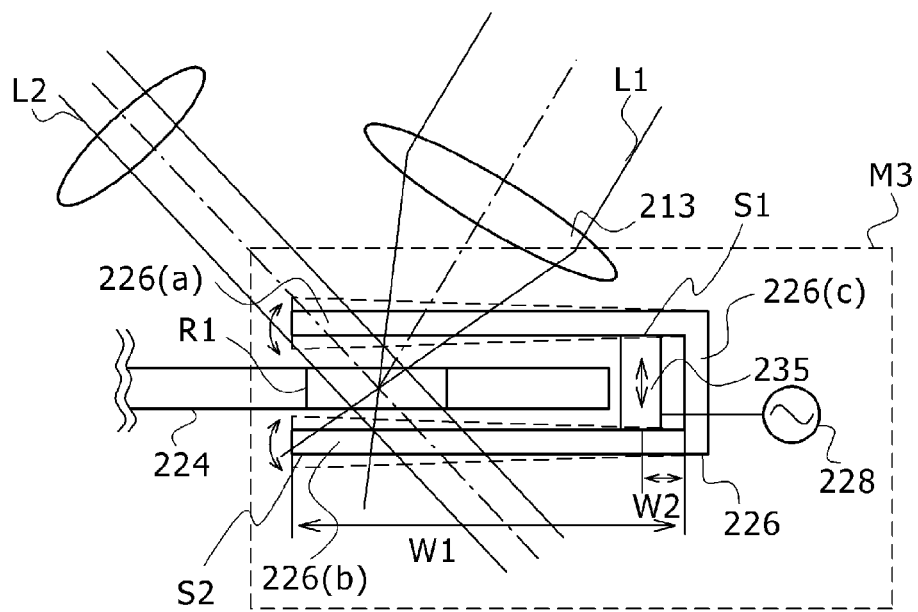
FIG. 5 is a structure diagram of a recording medium displacement control mechanism used by a recording device as a second embodiment of the present invention.

Explained next with reference to FIG. 5 are the structure and operation of the recording device as the second embodiment of the present invention. The overall structure of the recording device of the present embodiment is the same as that of its counterpart in FIG. 1.

FIG. 5 is a structure diagram of a recording medium displacement control mechanism, the recording medium being used in the recording device as the second embodiment of the present invention. In FIG. 5, the same reference numerals as those in FIG. 1 designate the same components.

FIG. 5 shows the structure of a displacement control mechanism M3 of the present embodiment. This mechanism is structurally different from the displacement control mechanism M2 indicated in FIG. 2. In the ensuing explanation with reference to FIG. 5, the same arrangements as those in the example of FIG. 2 will not be discussed further.

The displacement control mechanism M3 of the present embodiment is structured so that an oscillator 235 is interposed between the upper vibrating plate 226(a) and the lower vibrating plate 226(b).

The vibrating plate 226 is made up of the upper vibrating plate 226(a), a lateral support plate 226(c), and the lower vibrating plate 226(b), the vibrating plate 226 having a U-shape constituted of these three plates. The oscillator 235 is in contact with the upper and lower vibrating plates 226(a) and 226(b) having a length W1 each and is positioned at a distance W2 from the lateral support plate 226(c). When the oscillator 235 oscillates, the vibrating plate 226 is vibrated on the principle of leverage according to which the lateral support plate 226(c) acts as a fulcrum; a contact portion S1 between the oscillator 235 and the vibrating plate 226 serves as a power point; and a surface S2 where the lower vibrating plate 226(c) faces the recording medium 224 works as a point of action. The vibration of the surface where the vibrating plate 226 faces the recording medium 224 is amplified in accordance with the ratio of W1/W2. This amplification causes the vibrating plate 226 to generate a large repulsive force toward the recording medium 224, thereby reinforcing the displacement control on the recording medium 224.

When the oscillator 235 is vibrated at the resonance frequency of the vibrating plate 226, the vibration of the oscillator 235 is further amplified thereby.

Also, the surface S2 where the vibrating plate 226 faces the recording medium 224 is wider than the surface S1 where the oscillator 235 is in contact with the vibrating plate 226. For this reason, the surface area 52 where the vibrating plate 226 faces the recording medium 224 can be made larger without the surface area of the oscillator 225 being enlarged. In that respect, too, the repulsive force generated by the vibrating plate, 226 toward the recording medium 224 can be made larger than in the case of FIG. 3.

At this point, the vibration of the vibrating plate 226 is larger at its tip (in the rotation axis direction of the recording medium) than on the side of the lateral support plate 226(c), which renders the repulsive force from the vibrating plate 226 toward the recording medium 224 larger at the vibrating plate tip as well. For this reason, a region R1 where the signal light beam L1 and reference light beam L2 are emitted is located closer to the tip of the vibrating plate 226, the signal light beam L1 and the reference light beam L2 being used to do recording or reading by use of the recording medium 224. This is the position where a large repulsive force is applied to the recording medium 224.

The present embodiment also makes it possible to have the vibration amplitude and the vibrating surface area larger than in the case of FIG. 3. Hence, the repulsive force generated toward the recording medium can be easily boosted, which in turn enhances the effect of recording medium displacement control. This enhanced effect makes it possible to render smaller and thinner the displacement control device that restrains the bending of the recording medium (optical disk) or the vibration-induced fluctuation or tilt of the rotating recording medium in the rotation axis direction. This in turn enables implementation of a high-density and high-speed holographic memory.

Explained next with reference to FIG. 6 are the structure and operation of the recording device as the third embodiment of the present invention. The overall structure of the recording device of the present embodiment is the same as that of its counterpart in FIG. 1.

FIG. 6 is a set of structure diagrams of a recording medium displacement control mechanism, the recording medium being used in the recording device as the third embodiment of the present invention. In FIG. 6, the same reference numerals as those in FIG. 1 designate the same components.

A displacement control mechanism M4 of the present embodiment is structurally different from the displacement control mechanism M2 indicated in FIG. 2. In the ensuing explanation with reference to FIG. 6, the same arrangements as those in the example of FIG. 2 will not be discussed further.

The displacement control mechanism M4 of the present embodiment is made up of the vibrating plate 226, the oscillator 225, and a tilt translation stage 234. The basic structures and operations of the vibrating plate 226 and oscillator 225 are the same as explained above with reference to FIG. 2.

Figure 6A:
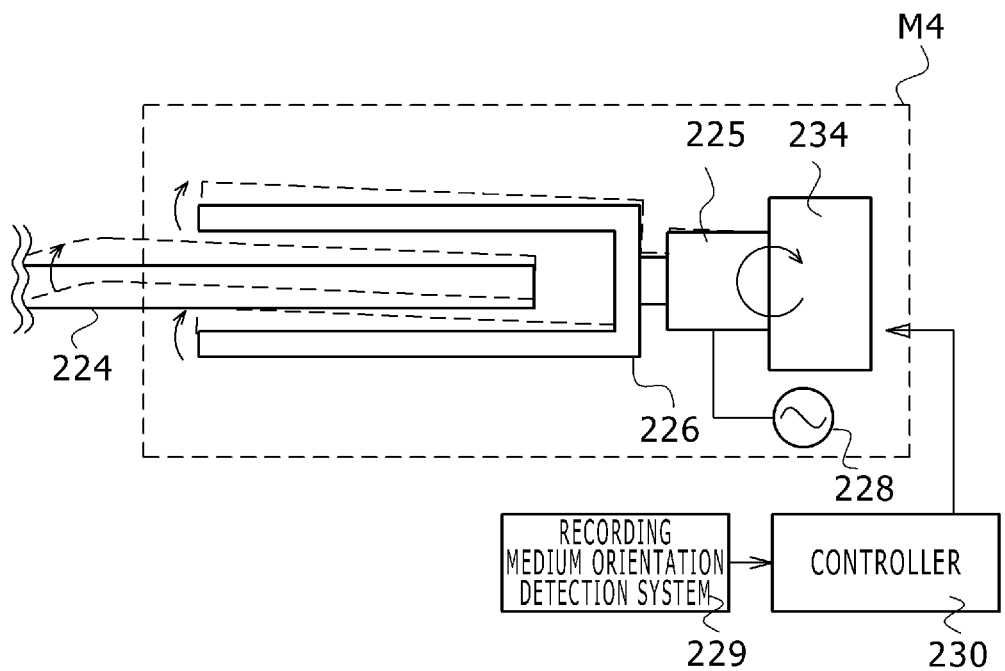
FIG. 6A is a structure diagram of a recording medium displacement control mechanism used by a recording device as a third embodiment of the present invention.

The oscillator 225 is fixed to the tilt translation stage 234. The recording medium orientation detection system 229 detects the tilt and position of the recording medium 224, and causes the controller 230 to control the tilt translation stage 234 by use of the detected signals. For example, when the tilt translation stage 234 tilts in the rotation axis direction of the recording medium 224 as shown in FIG. 6A, the vibrating plate 226 is also tilted accordingly. The recording medium 224 is then tilted by means of the above-mentioned squeeze air film pressure.

Figure 6B:
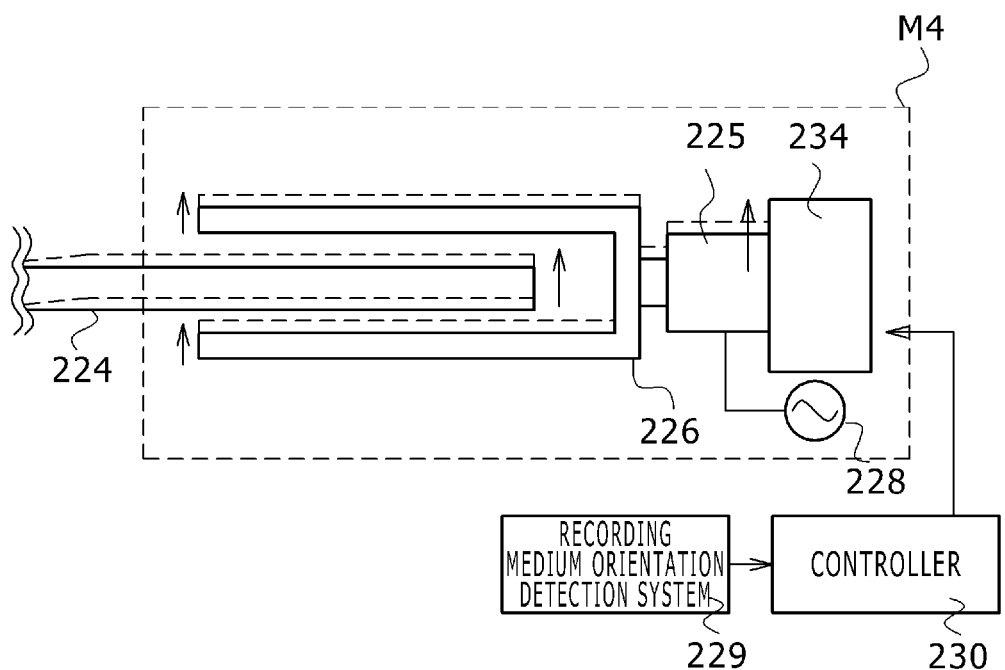
FIG. 6B is another structure diagram of the recording medium displacement control mechanism, the recording medium being used in the recording device of the third embodiment.

On the other hand, if the tilt translation stage 234 translates in the rotation axis direction of the recording medium 224 as shown in FIG. 6B, the vibrating plate 226 and recording medium 224 accordingly translate in the rotation axis direction. When the vibrating plate 226 is translated and tilted in the manner explained above, the recording medium 224 can be controlled in its tilt and position.

In the example explained above with reference to FIG. 1, the recording medium orientation detection system 229 is used to detect the rotation angle, tilt, and position of the recording medium 224. When the recording medium 224 is to be adjusted to a predetermined rotation angle, tilt, and position, the recording medium orientation detection system 229 detects signals corresponding to each of the rotation angle, tilt, and position of the recording medium. The recording medium orientation detection system 229 further causes the controller 230 to control the rotary motor 222, stage 227 and other relevant components by use of the detected signals. Here, because the rotary motor 222 and stage 227 are heavier than the vibrating plate 226 and oscillator 225 shown in FIG. 6, the responsiveness of control may not be sufficiently high. With the present embodiment, on the contrary, the driven members of the tilt translation stage 234 are the vibrating plate 226 and oscillator 225 both having relatively light weight. This contributes to improving the responsiveness in controlling the rotation angle, tilt, and position.

As explained above, the present embodiment renders the vibration amplitude and the vibrating surface area larger than the example in FIG. 3. Thus the embodiment readily boosts the repulsive force generated toward the recording medium. Because it is easy to enlarge the repulsive force toward the recording medium in this manner, the effect of recording medium displacement control can be reinforced. That makes it possible to render smaller and thinner the displacement control device that restrains the bending of the recording medium (optical disk) or the vibration-induced fluctuation or tilt of the rotating recording medium in the rotation axis direction. Furthermore, the responsiveness of control can be improved. All this contributes to implementing a high-density and high-speed holographic memory.

Explained next with reference to FIG. 7 are the structure and operation of the recording device as the fourth embodiment of the present invention. The overall structure of the recording device of the present embodiment is the same as that of its counterpart in FIG. 1.

FIG. 7 is a set of structure diagrams of a recording medium displacement control mechanism, the recording medium being used in the recording device as the fourth embodiment of the present invention. In FIG. 7, the same reference numerals as those in FIG. 1 designate the same components.

A displacement control mechanism M5 of the present embodiment is structurally different from the displacement control mechanism M2 indicated in FIG. 2. In the ensuing explanation with reference to FIG. 7, the same arrangements as those in the example of FIG. 2 will not be discussed further.

Figure 7A:
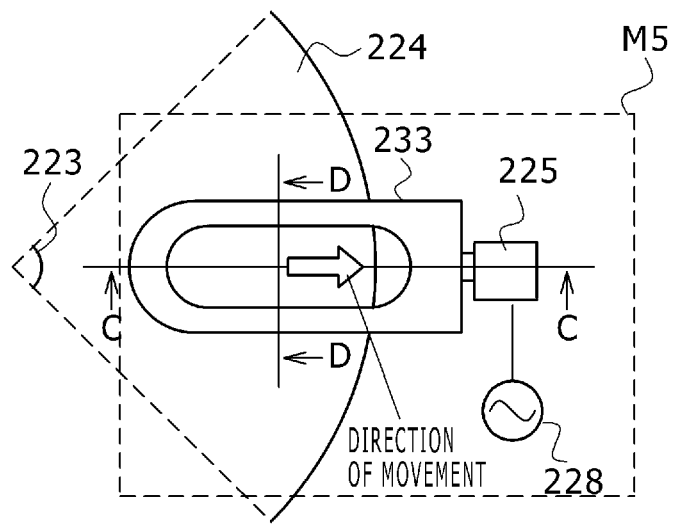
FIG. 7A is a structure diagram of a recording medium displacement control mechanism used by a recording device as a fourth embodiment of the present invention.
Figure 7B:
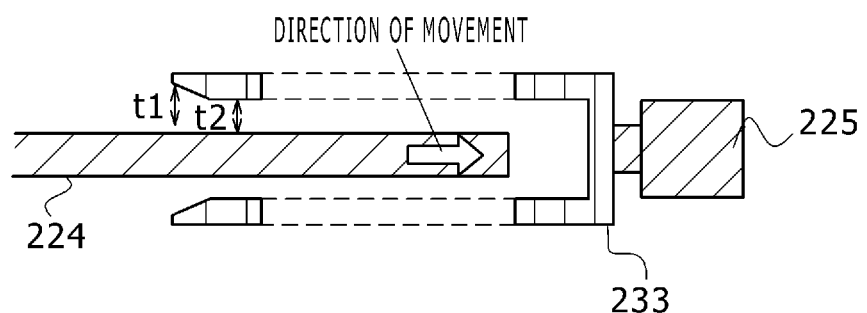
FIG. 7B is another structure diagram of the recording medium displacement control mechanism, the recording medium being used in the recording device of the fourth embodiment.

FIG. 7A shows part of the recording medium 224 and displacement control mechanism M5 as seen from the incident direction of the signal light L1 toward the rotation axis 223 of the rotary motor 222. FIG. 7B shows a cross section of the displacement control mechanism M5 taken along line C-C in FIG. 7A, and FIG. 7C shows a cross section of the displacement control mechanism M5 taken along line D-D in FIG. 7A.

Figure 7C:
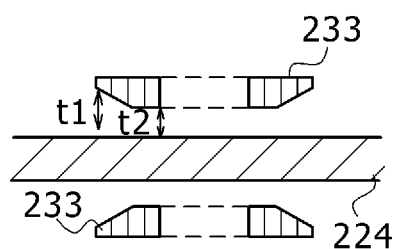
FIG. 7C is another structure diagram of the recording medium displacement control mechanism, the recording medium being used in the recording device of the fourth embodiment.

As shown in FIGS. 7B and 7C, the gap between the recording medium 224 and a vibrating plate 233 over an outer edge region (t1) is greater than that over the other region (t2). With this arrangement in place, as the recording medium 224 is being inserted into the vibrating plate 233, the gap therebetween becomes progressively narrower so that the repulsive force generated by the vibrating plate 233 to the recording medium 224 becomes larger. Thus even if the positional relation between the recording medium 224 and the vibrating plate 233 is shifted in the rotation axis direction, the recording medium 224 can be easily inserted into the vibrating plate 233 with no contact occurring therebetween.

According to the present embodiment, it is easier to insert the recording medium into the clearance of the vibrating plate.

DESCRIPTION OF REFERENCE NUMERALS

201 Light source
202 Collimating lens
203 Shutter
204 Half-wavelength plate
205 Polarization beam splitter
206 Beam expander
207 Phase mask
208 Relay lens
209 Polarization beam splitter
210 Spatial light modulator
211 Relay lens
212 Spatial filter
213 Object lens
214 Polarization direction changing element
215, 216 Mirror
217, 220 Galvanometer mirror
218, 219 Lens
221 Photodetector
222 Rotary motor
223 Rotation axis
224 Recording medium
225 Oscillator
226 Vibrating plate
227 Stage
228 AC power source
229 Recording medium orientation detection system
230 Controller
231 Frame
232 Oscillator
233 Vibrating plate
234 Tilt translation stage
235 Oscillator
L1 Signal light beam
L2 Reference light beam
M1 Recording device
M2, M3, M4 Displacement control mechanism

The invention claimed is:

1. A recording device comprising:
   a recording medium;
   a motor that drives the recording medium;
   a head that records and reads out a signal to and from the recording medium;
   a vibrating plate that has two opposing surfaces facing the recording medium, the vibrating plate being displaced in a rotation axis direction of the recording medium; and
   an oscillator that is positioned away from the two opposing surfaces of the vibrating plate facing the recording medium, the oscillator driving and displacing the vibrating plate;
   wherein the vibrating plate has two plate-like structures;
   wherein, when the oscillator displaces the vibrating plate, the two plate-like structures of the vibrating plate are displaced at a same frequency in the rotation axis direction of the recording medium; and
   wherein vibration phases of the two plate-like structures are 180 degrees apart in an opposite phase mode.

2. The recording device according to claim 1, wherein, when a natural resonance frequency of the vibrating plate coincides with an oscillating frequency of the oscillator, the oscillator oscillates the vibrating plate at a resonance frequency thereof.

3. The recording device according to claim 1, wherein a surface area S2 of the two opposing surfaces of the vibrating plate facing the recording medium is larger than a surface area S1 of the oscillator that is in contact with the vibrating plate.

4. A recording device comprising:
   a recording medium;
   a motor that drives the recording medium;
   a head that records and reads out a signal to and from the recording medium;
   a vibrating plate that has two opposing surfaces facing the recording medium, the vibrating plate being displaced in a rotation axis direction of the recording medium;
   an oscillator that is positioned away from the two opposing surfaces of the vibrating plate facing the recording medium, the oscillator driving and displacing the vibrating plate; and
   an orientation control mechanism that can change positional and angular relations between the vibrating plate and the recording medium in accordance with an external control signal.

5. A recording device comprising:
   a recording medium;
   a motor that drives the recording medium;
   a head that records and reads out a signal to and from the recording medium;
   a vibrating plate that has two opposing surfaces facing the recording medium, the vibrating plate being displaced in a rotation axis direction of the recording medium; and
   an oscillator that is positioned away from the two opposing surfaces of the vibrating plate facing the recording medium, the oscillator driving and displacing the vibrating plate;
   wherein a piezoelectric element is employed in the oscillator.

6. The recording device according to claim 1, wherein, between the two opposing surfaces of the vibrating plate facing the recording medium, outer edge regions of the vibrating plate have a longer distance than other regions thereof.

7. The recording device according to claim 1, wherein the recording medium is a disk.

8. The recording device according to claim 5, wherein, between the two opposing surfaces of the vibrating plate facing the recording medium, outer edge regions of the vibrating plate have a longer distance than other regions thereof.

9. The recording device according to claim 4, wherein the recording medium is a disk.

10. The recording device according to claim 5, wherein, between the two opposing surfaces of the vibrating plate facing the recording medium, outer edge regions of the vibrating plate have a longer distance than other regions thereof.

11. The recording device according to claim 5, wherein the recording medium is a disk.

* * * * *